United States Patent [19]
Sim

[11] Patent Number: 6,078,447
[45] Date of Patent: Jun. 20, 2000

[54] STAGGERED SERVO WRITING METHOD IN A HARD DISK DRIVE EMPLOYING STAGGERED SERVO WRITING

[75] Inventor: Dong-Goo Sim, Ahnyang, Rep. of Korea

[73] Assignee: SamSung Electronics Co., Ltd., Kyungki-do, Rep. of Korea

[21] Appl. No.: 08/951,023

[22] Filed: Oct. 15, 1997

[30] Foreign Application Priority Data

Oct. 17, 1996 [KR] Rep. of Korea ........................ 96-46539

[51] Int. Cl.[7] .................................. G11B 5/09; G11B 5/03
[52] U.S. Cl. ................................................ 360/48; 360/66
[58] Field of Search .................................. 360/48, 66, 57, 360/77.08

[56] References Cited

U.S. PATENT DOCUMENTS 5,084,791 1/1992 Thanos et al. ........................ 360/77.04
5,375,020 12/1994 Aggarwal et al. .

*Primary Examiner*—W. Chris Kim
*Attorney, Agent, or Firm*—Robert E. Bushnell, Esq.

[57] ABSTRACT

A staggered servo writing technique of a hard disk drive includes the steps of: setting a plurality of cylinders on disks to a group, writing servo information on each cylinder of the group set above by a specified head, and writing servo information on the remaining cylinders of the disks.

11 Claims, 4 Drawing Sheets

STAGGERED SERVO WRITING METHOD IN A HARD DISK DRIVE EMPLOYING STAGGERED SERVO WRITING

CLAIM OF PRIORITY

This application makes reference to, incorporates the same herein, and claims all benefits accruing under 35 U.S.C. §119 from an application for *STAGGERED SERVO WRITING METHOD IN A HARD DISK DRIVE EMPLOYING STAGGERED SERVO WRITING MANNER* earlier filed in the Korean Industrial Property Office on Oct. 17, 1996 and there duly assigned Serial No. 46539/1996.

BACKGROUND OF THE INVENTION

1. Field of the Invention

The present invention relates to a hard disk drive adopting the staggered servo writing method, and particularly to a method for staggered servo writing without necessitating direct current (DC) erasing.

2. Description of the Related Art

In the hard disk drives widely used as auxiliary storing devices for computer systems, data are stored in the tracks arranged concentrically on each disk surface and cylindrically with the same track number on all the disks; the tracks are divided into sectors consisting of data sectors for storing information and servo sectors for storing servo information. In order to read and write on the specific sectors, the head must be moved onto the desired track, which is called track seeking, while the track following means to control the head to correctly follow the track. Accordingly, in order to move onto the specific track, the head must recognize its own position relative to the tracks, in other words, it should be furnished with the information as to the relative position of the head, i.e. the servo information has an inherent pattern. The servo information is permanently recorded in advance on the disk by a servo writer during the manufacture of the disk drive. The typical servo writing techniques are the dedicated and the embedded techniques.

The dedicated servo writing technique writes the servo information on the entire surface of the most stable disk selected from among a plurality of disk surfaces, and the embedded servo writing technique inserts a predetermined number of servo sectors alternately between data sectors on each surface of all of the disks so as to write the servo information of the same type and format on the servo sectors. Besides, the embedded servo writing technique is classified into the non-staggered and the staggered embedded servo writing techniques (hereinafter defined as the "staggered servo writing technique"), the latter of which is widely adopted because of enabling the reduction of the write cycle time for the servo writing.

The tracks corresponding to heads 0–3 are arranged vertically on all four disk surfaces to form a cylinder with the same track number from the top disk to the bottom disk, in which the servo sectors are shifted by a given time interval from each other, which can be implemented by switching all heads each at a given time interval during one rotation. However, the above staggered servo writing technique is attended with unavoidable difficulties when manufacturing hard disk drives practically. For example, firstly, defective servo information recorded by employing the staggered servo writing technique can be caused by a defect of the servo writer itself, a defective working process and an accidental external impact, which results in the defective recording. Secondly, although the quality itself of the servo information may be perfect, if a defective magnetic layer of the disk surface itself accidentally coincides with the servo sector, errors in the servo information are caused. Therefore, if such defects are caused, the defective servo sector must be shifted from the original position to rewrite the servo information on the new position. When rewriting the servo information for the HDD adopting the staggered servo writing technique, DC erasing must always precede the rewriting of the servo information to avoid the confusion of the servo control caused by the simultaneous presence of both the preceding and the rewritten servo information.

The earlier servo data erasing methods for the hard disk drives adopting the staggered servo writing technique are as follows:

The first is a method to erase all disk surfaces by means of servo writer before rewriting the servo information after mounting the hard disk assembly (HDA).

The second is a method to subject the disks to a separate erasing process by means of a simple erasing device manufactured with a similar construction to the servo writer because the erasing device doesn't require the precision of the servo writer.

The third is a method to demagnetize all disk surfaces without or with opening the covers of the HDD by means of a simple erasing jig employing a strong permanent magnet.

The fourth is a method to collectively demagnetize hard disks by means of a strong permanent magnet after dismantling hard disk assemblies and thereafter reassembling hard disks.

However, these earlier methods are attended with the following problems:

In the first method, the servo writer is not only an expensive equipment, but also has the problems of cycle time running counter to the trend of the cycle time reduction, and the load of the servo writer is increased, thereby reducing the lifetime of the servo writer and increasing the cycle time.

The second method requires an additional investment to manufacture an erasing equipment and maintain an onerous erasing process.

In the third method, although the disks are demagnetized without removing the heads by a strong permanent magnet force, the properties of the heads are changed instead, resulting in further worsening the problem, and it becomes more difficult to demagnetize the disks by means of the permanent magnet because the magnetic coercive force of the disks are continuously improved.

The fourth method provides onerous work for dismantling hard disk drives many of which are defect free and not necessary to be dismantled, thereby being attended with unnecessary overhead expenses.

The following patents each disclose features in common with the present invention but do not teach or suggest the staggered servo writing method of the present invention: U.S. Pat. No. 5,627,946 to Strang Jr., entitled *Hard Disk Format Using Frames Of Sectors To Optimize Location Of Servo Bursts*, U.S. Pat. No. 5,612,834 to Strang Jr., entitled *Servo Burst Controller For A Magnetic Disk*, U.S. Pat. No. 5,452,284 to Miyagawa et al, entitled *Optical Recording/ Reproducing Medium And Apparatus Using Land And Groove Encoded Information Signals And Identification Signals Including Position Information*, U.S. Pat. No. 5,440,474 to Hetzler, entitled *Magnetic Recording Disk With Equally Spaced Servo Sectors Extending Across Multiple Data Bands*, U.S. Pat. No. 5,608,587 to Smith, entitled

*Method Using Magnetic Disk Servo Pattern With Buried Identification Patterns*, U.S. Pat. No. 5,448,429 to Cribbs et al., entitled *Self-Servowriting Disk Drive And Method*, U.S. Pat. No. 5,381,281 to Shrinkle et al., entitled *Disk Drive System Using Multiple Embedded Quadrature Servo Fields*, U.S. Pat. No. 5,267,907 to Hedeen, entitled *Control System For Variation Of The Sheave Ratio In A Continuously Variable Transmission*, U.S. Pat. No. 4,980,783 to Meir et al., entitled *Apparatus For Automatically Applying Servo Track Data To A Selected Servo Surface Of A Hard Disk Within A Hard Disk Assembly.*

SUMMARY OF THE INVENTION

Accordingly, it is an object of the present invention to provide a servo writing method for reducing the process time by eliminating the DC erasing process required for rewriting servo information for hard disk drives adopting the staggered servo writing.

According to the present invention, a staggered servo writing method of a hard disk drive comprises the steps of setting a plurality of cylinders on disks to a group, writing servo information on each cylinder of the group set above by means of a specified head, and writing servo information on the remaining cylinders of the disks by employing the staggered servo writing technique.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
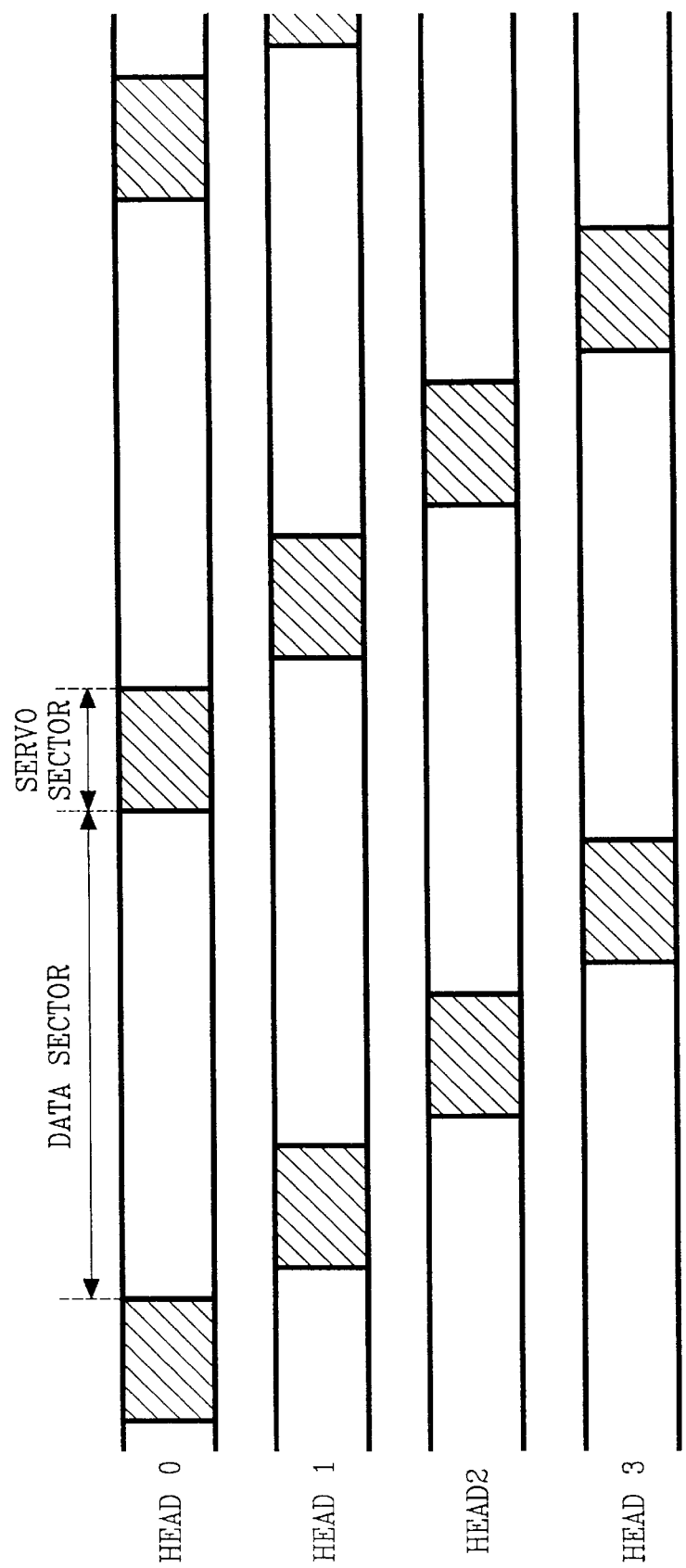
FIG. 1 is a spread view illustrating a sector format of the specific cylinder of an HDD having two disks, wherein the sector format includes servo information recorded by employing the staggered servo writing technique.

FIG. 1 is a view illustrating a sector format of the specific cylinder of an HDD having two disks, wherein the sector format includes servo information recorded by employing the staggered servo writing technique. This format is discussed in detail above in the Description of the Related Art.

Figure 2:
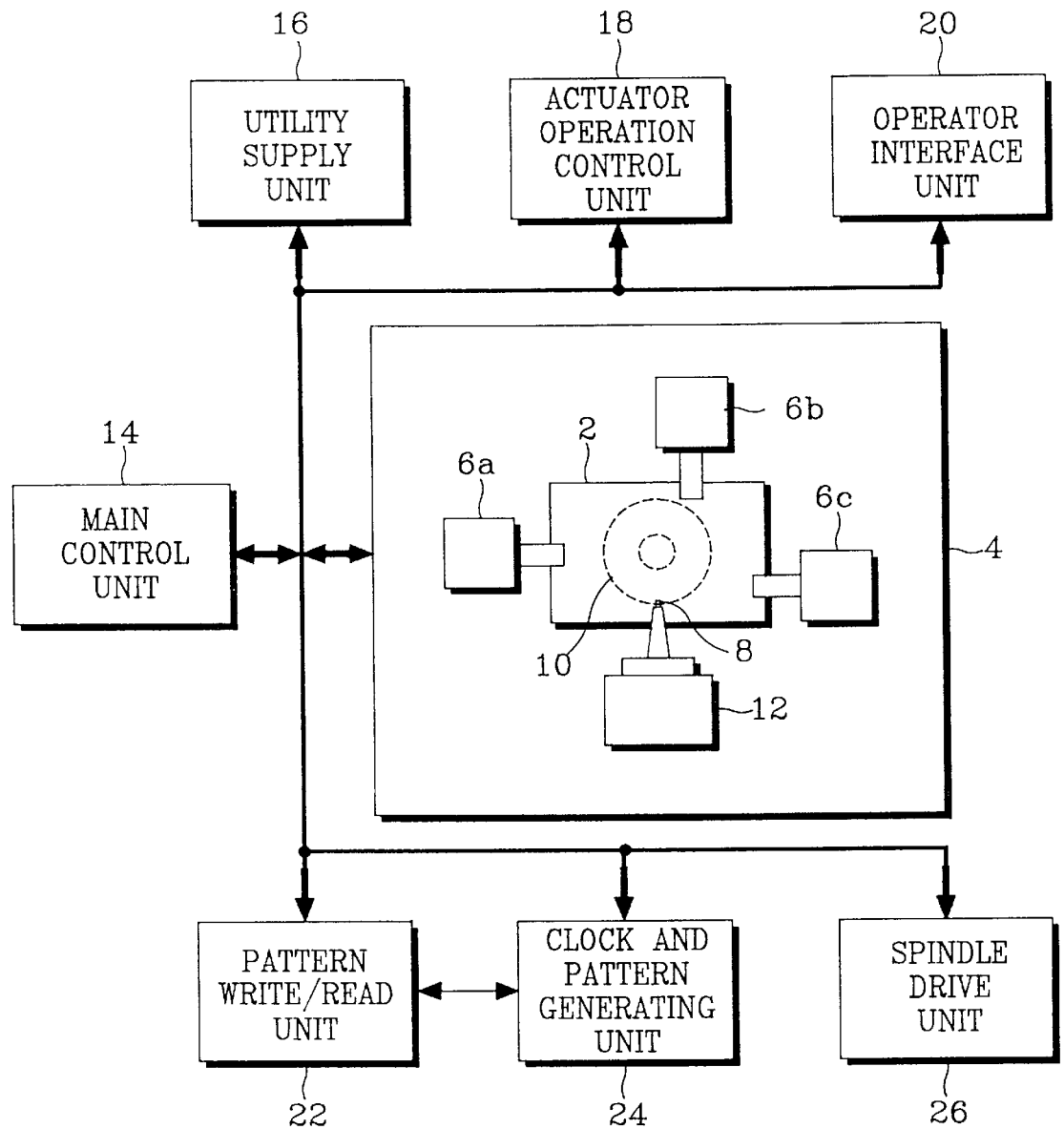
FIG. 2 is a block diagram illustrating a servo writer for writing servo information on disks after assembling the hard disk drives.

Referring to FIG. 2, the circuits of the servo writer and the hard disk assembly 2 are connected to each other by a pogo pin, and the fixture unit 4 has clamping units 6a, 6b, and 6c for fixing the hard disk assembly 2 and a clock head unit 12 for writing the reference clock on the disk 10 by means of the clock head 8. The servo reference clock is usually a clock for taking a reference position on the disks 10 when servo writing, whereby the servo information is written usually in a predetermined position on the disks 10, i.e. in an area outside the outermost servo track.

The servo tracks are formed on disks 10 by the servo writer. The clock head 8 is usually loaded onto the reference clock position through a hole provided on the side of the hard disk assembly 2. The side hole is normally sealed by a label. The main control unit 14 is the servo writer's main control device which controls all the constituent parts. The utility supply unit 16 supplies operating power to the servo writer and air to the hard disk assembly 2. The actuator operation control unit 18 controls the actuator movement. The operator interface unit 20 interfaces between the main control unit 14 and an operator terminal unit for controlling and monitoring the operation of the servo writer.

The pattern write/read unit 22 writes and reads the servo information to and from the disks 10 by means of a head(not illustrated in the drawings) under the control of the main control unit 14. The clock and pattern generating unit 24 generates the reference clock and the servo information pattern under the control of the main control unit 14. The spindle drive unit 26 drives the spindle motor under the control of the main control unit 14.

Figure 3:
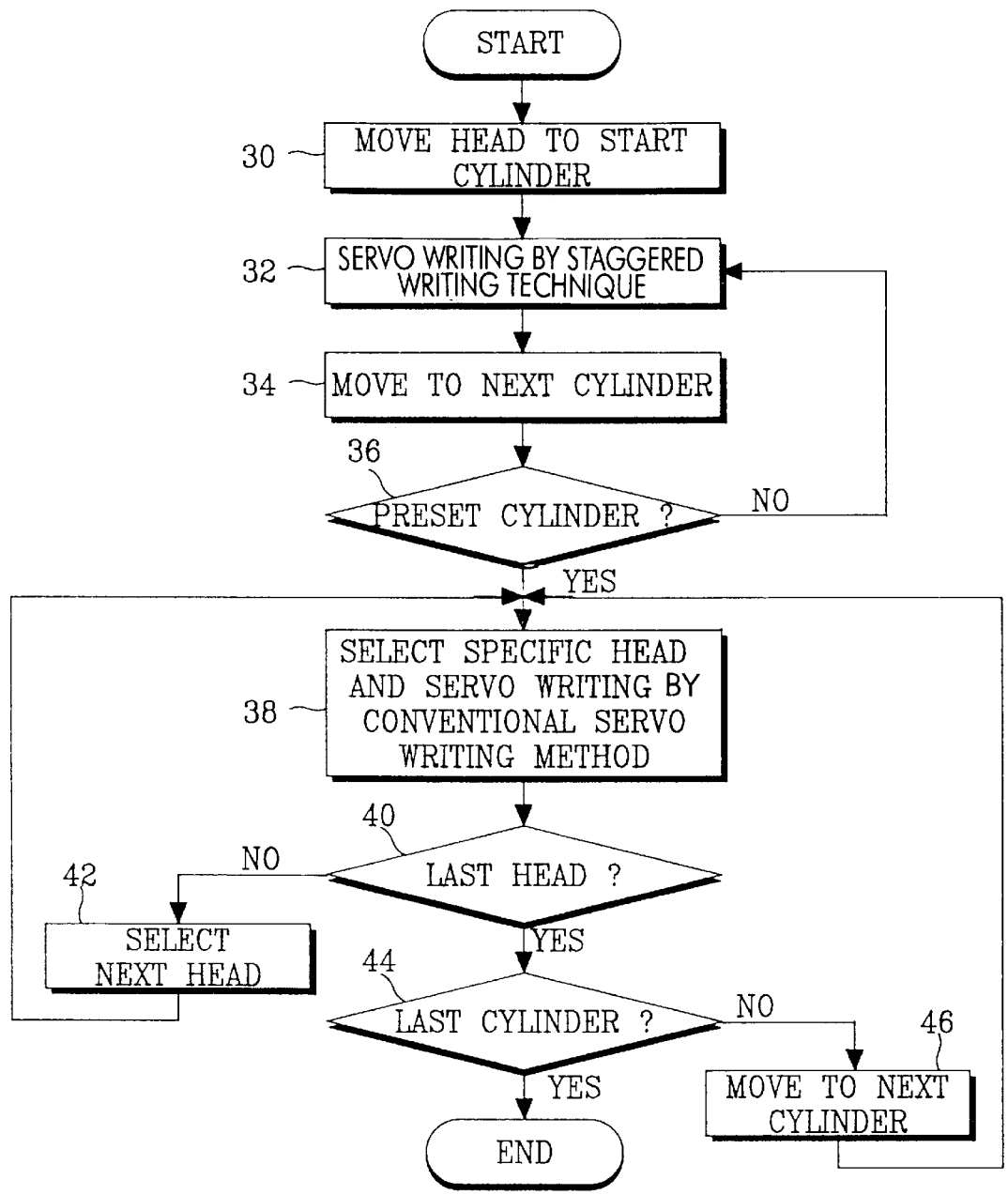
FIG. 3 is a flowchart of the main control unit 14 for describing the staggered servo writing technique according to an embodiment of the present invention.
Figure 4:
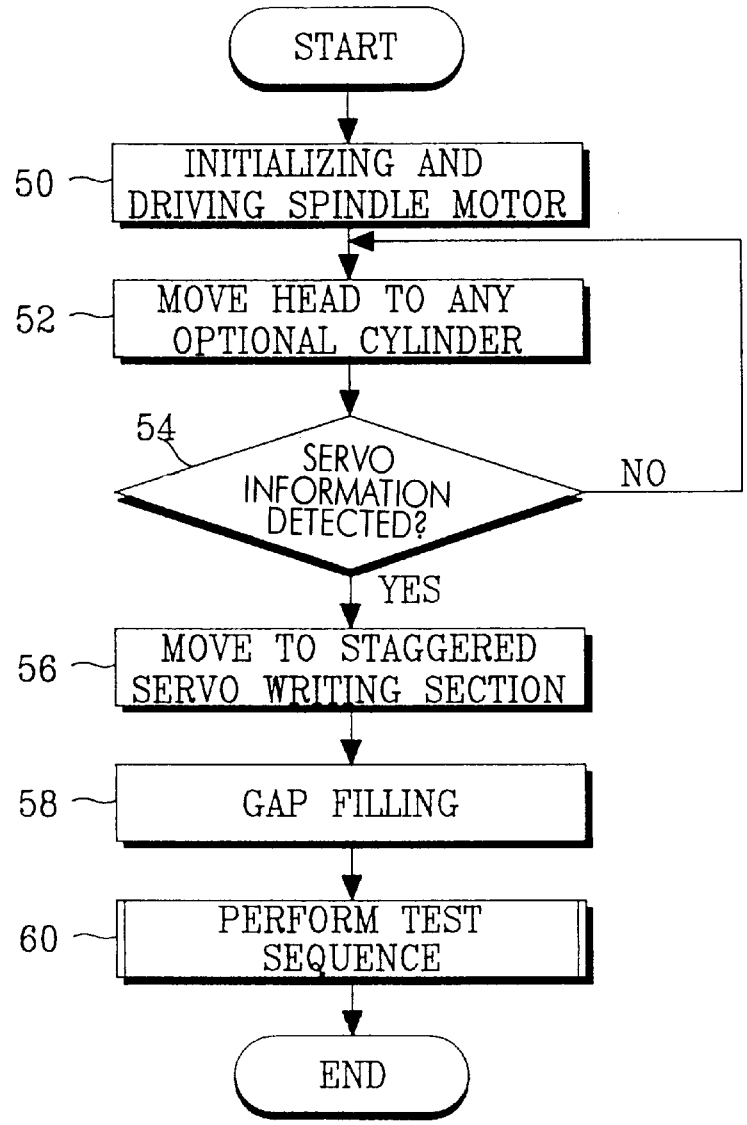
FIG. 4 is a flowchart for testing the hard disk drive without confusion by using the servo information recorded by the staggered servo writing technique according to an embodiment of the present invention.

Referring to FIGS. 2, 3, and 4, the staggered servo writing and the test methods are explained in detail according to an embodiment of the present invention. First, as shown in FIG. 2, when the servo writer starts to write the servo information after the hard disk assembly 2 is mounted on and connected to the fixture unit 4 of the servo writer, the main control unit 14 moves the head to the start cylinder in Step 30 as shown in FIG. 3. The start cylinder is the first cylinder to which the outermost cylinder is usually allocated, whereby the servo information is recorded thereon.

When the head is positioned on the start cylinder, the main control unit 14 proceeds to Step 32 to perform the servo writing by employing the staggered servo writing technique and then proceeds to Step 34. In Step 34, the main control unit 14 moves the head to the next cylinder and proceeds to Step 36 to check whether the currently selected cylinder (hereinafter referred to as "current cylinder") is set for change of the servo writing technique.

If the current cylinder isn't set therefor, the main control unit 14 returns to Step 32 to further perform the servo writing on the next servo track by employing the staggered servo writing technique. In other words, the main control unit 14 continues to perform the servo writing by the staggered servo writing technique until the head is positioned on the specific cylinder within the preset cylinder group. As the result of the checking in Step 36, if the current cylinder corresponds to a preset cylinder, the main control unit 14 proceeds to Step 38. The preset cylinders are cylinders optionally selected from among data areas on the disks 10 for implementing the present invention, wherein it is assumed that five hundred cylinders in the vicinity of the inner crash stop (ICS) are preset for the above embodiment of the present invention.

Further in Step 38, the main control unit 14 selects a specific head (usually head 0) from among all heads to perform servo writing (hereinafter referred to as conventional servo writing method") on the entire tracks at specified intervals without head switching, and then proceeds to Step 40. In Step 40, the main control unit 14 checks, without moving the cylinder position, as to whether or not the currently selected head (hereinafter referred to as "current head") is the last head.

As a result, if the current head isn't the last one, the main control unit 14 proceeds to Step 42 to select the next consecutive head number right after the previously selected head in Step 38, thereby repeating the Steps 38 and 40. Upon checking in Step 40, if the current head is the last one, the main control unit 14 proceeds to Step 42. In Step 42, the main control unit 14 checks whether the current cylinder is the last one among the preset cylinder group. Namely, in Step 44, the main control unit 14 checks whether the servo writings are completed for all the cylinders within the preset cylinder group. Upon checking in Step 44, if the current cylinder isn't the last one of the preset cylinder group, the main control unit 14 proceeds to Step 46 to move the selected head to the next cylinder and proceeds to Step 38, thereby repeating the steps from 38 to 44.

Upon checking in Step 44, if the current cylinder corresponds to the last cylinder of the preset cylinder group, the main control unit 14 terminates the conventional servo writing process. In other words, for writing the servo information, the staggered servo writing technique is applied to the cylinders from the outermost cylinder to the cylinder just before the preset cylinder group, and the conventional servo writing technique is applied to the preset cylinder group. The time interval between sectors of each head for the conventional servo writing technique is controlled to be the same time interval as for the staggered servo writing technique. Further, when proceeding with the conventional servo writing, any optional data are written in the data sections between servo sectors to erase the previous servo information recorded on the disks.

The testing process of the hard disk drive with the specific servo information recorded by the above staggered servo writing method is explained with reference to FIG. 4. The drive test is programmed so that the drive initialization can be executed within the range of the above preset cylinders group in order for the drive to find and get synchronized with one of the servo information in the above preset cylinder group at the beginning of drive testing, because the drive must always be synchronized with the latest servo information although the drive could be servo track written several times.

The drive test proceeds as follows:

When power is first supplied to the drive, the microcontroller (referred to the usual control device of the hard disk drive) initializes various variables according to the initialization program and at the same time starts the spindle motor in Step 50. When the spindle motor reaches the normal speed, the microcontroller proceeds to Step 52, thereby unlatching the actuator. At this time, the heads are moved to a cylinder within the preset cylinder group by a spontaneous mechanical balancing force or by a minute bias force applied to the actuator.

In Step 54, the microcontroller checks whether the servo information is detected from the cylinder on which the heads are positioned, and proceeds to Step 56 when detecting the servo information. In Step 56, the microcontroller moves the heads to the cylinders section on which the servo information is recorded by the staggered servo writing technique. Thereafter, the microcontroller proceeds to Step 58 to fill up sections (gap filling) except the servo sectors within all the staggered servo writing sections with any optional data pattern, thereby erasing all the old servo information. The microcontroller then proceeds to Step 60 to perform the remaining test sequences. Consequently, the previously written servo information is entirely erased by the above gap filling process, whereby the disk drive is set to the perfect drive condition.

As aforementioned, the present invention has the advantages that the process time can be substantially reduced by eliminating the separate DC erasing process required for rewriting servo information on disks and the old servo information can be erased without requiring an additional erasing equipment. It is a further advantage that the possible change of the properties of the heads during DC erasing can be prevented.

What is claimed is:

1. A servo writing method of a hard disk drive comprising the steps of:

setting a plurality of cylinders on disks to a preset cylinder group, the preset cylinder group defining an inner annular area on the disks;

writing servo information, using a non-staggered servo writing technique, on each cylinder of said preset cylinder group by means of a specified head; and writing servo information on the remaining cylinders on said disks by employing the staggered servo writing technique.

2. A servo writing method as defined in claim 1, further comprising the steps of detecting servo information from any of the cylinders of said preset cylinder group and erasing the previous servo information written on said remaining cylinders in synchronism with the detected servo information.

3. A servo writing method as defined in claim 2, said old servo information written on said remaining cylinders of said disks being erased during a drive test mode.

4. A servo writing method as defined in claim 3, said previous servo information written on said remaining cylinders of said disks being erased by writing any optional data pattern.

5. A servo writing method as defined in claim 1, said preset cylinder group being limited to a specific disk selected from among a plurality of disks.

6. A servo writing method as defined in claim 1, said preset cylinders group being limited to more than one optional disk surface selected from among a plurality of disk surfaces.

7. A servo writing method as defined in claim 5, further comprising a step of detecting servo information from the head corresponding to a specific disk surface and erasing previous servo information recorded on said remaining cylinders in synchronism with said detected servo information.

8. A staggered servo writing method of a hard disk drive comprising the steps of:

setting a plurality of cylinders on disks to a preset cylinder group;

writing servo information on each cylinder of said preset cylinder group by means of a specified head;

writing servo information on the remaining cylinders on said disks by employing the staggered servo writing technique;

detecting servo information from any of the cylinders of said preset cylinder group; and erasing the previous servo information written on said remaining cylinders in synchronism with the detected servo information.

9. A staggered servo writing method as defined in claim 8, said old servo information written on said remaining cylinders of said disks being erased during a drive test mode.

10. A staggered servo writing method as defined in claim 9, said previous servo information written on said remaining cylinders of said disks being erased by writing any optional data pattern.

11. A staggered servo writing method of a hard disk drive comprising the steps of:

setting a plurality of cylinders on disks to a preset cylinder group, said preset cylinder group being limited to a specific disk selected from among a plurality of disks;

writing servo information on each cylinder of said preset cylinder group by means of a specified head;

writing servo information on the remaining cylinders on said disks by employing the staggered servo writing technique;

detecting servo information from the head corresponding to a specific disk surface; and erasing previous servo information recorded on said remaining cylinders in synchronism with said detected servo information.

* * * * *